United States Patent [19]

Cheng et al.

[11] Patent Number: 5,272,218
[45] Date of Patent: Dec. 21, 1993

[54] POLYMERIC COMPOSITIONS FOR NONLINEAR OPTICS

[75] Inventors: Lap-Tak A. Cheng, Newark, Del.; Wilson Tam, Boothwyn, Pa.

[73] Assignee: E. I. Du Pont de Nemours and Company, Wilmington, Del.

[21] Appl. No.: 934,063

[22] Filed: Aug. 21, 1992

[51] Int. Cl.$^5$ ............... C08F 34/04; C08F 32/08; C08F 26/00
[52] U.S. Cl. ............... 525/326.8; 525/328.2; 525/328.3; 525/328.4; 525/328.7; 525/329.8; 525/329.9; 525/348; 525/375; 525/377; 526/256; 526/258; 526/263; 526/284; 526/315
[58] Field of Search ............... 525/326.8, 328.2, 329.8, 525/329.9, 328.3, 328.4, 328.7; 526/256, 258, 263, 284, 315

[56] References Cited

U.S. PATENT DOCUMENTS

| | | | |
|---|---|---|---|
| 4,877,411 | 10/1989 | Hines et al. | 8/403 |
| 4,909,964 | 3/1990 | Clement et al. | 252/582 |
| 4,978,476 | 12/1990 | Allen et al. | 252/299.01 |

FOREIGN PATENT DOCUMENTS 2-118524  5/1990  Japan.
WO91/03504  3/1991  World Int. Prop. O.

OTHER PUBLICATIONS

Encyclopedia of Polymer Science and Engineering, vol. 6, pp. 242–245, 757, Wiley, New York, (1986).
F. W. Billmeyer, Textbook of Polymer Science, 3rd Ed pp. 320–323, Wiley, New York, 1984.
Chem. Abstr. 112(18):160484v.
P. R. Ulrich, (1988) Mol. Cryst. Liq. Cryst. 160, 1–31.
L. T. Cheng, et al., SPIE, vol. 1147, p. 61–72 (1989).
Cahill et al., Chemistry of Anomalous–Dispersion Phase-Matched Second Harmonic Generation, Ch. 12 (1991) American Chemical Society, pp. 200–213.

*Primary Examiner*—Joseph L. Schofer
*Assistant Examiner*—Mark Nagumo

[57] ABSTRACT

Disclosed are polymers which contain NLO dye moieties based upon a barbituric acid group, a thiobarbituric acid group or a 1,3-bis(dicyanomethylene)indan-2-ylidene group. These polymers, after poling, are useful in NLO elements in devices employing nonlinear optics. Also disclosed are various intermediates used in making such polymers.

15 Claims, No Drawings

POLYMERIC COMPOSITIONS FOR NONLINEAR OPTICS

FIELD OF THE INVENTION

This invention relates to polymers containing NLO dye moieties which may be poled for use in elements for devices employing nonlinear optics; and to intermediates useful for making such polymers.

TECHNICAL BACKGROUND

Nonlinear optical dyes (organic molecules having large nonlinear polarizabilities) have been recognized as potentially useful as components of the optical elements in optical frequency converters and in electrooptic devices. Japanese Patent Application 2/118,524 for example, describes the use of (thio)barbituric acid containing compounds as NLO dyes. Generally, in order for the NLO dyes to exhibit the large second order optical susceptibilities essential to nonlinear optic applications, the molecules must be constructively arrayed in a noncentrosymmetric configuration. Some molecules have been crystallized in a noncentrosymmetric space group, but this method does not work for all potentially useful molecules, and the resulting shape and properties are limited by the very nature of a crystal.

Certain NLO dyes have been used, for example, in combination with glassy polymers to provide nonlinear optical elements. The choice of the dye molecule and glassy polymer affects the stability of nonlinear optical effect obtained, because the aligned dye molecules have a tendency to "relax" over time, thereby losing the alignment necessary for the enhanced nonlinear optical properties.

NLO groups based on some NLO dye moieties have been used as side groups for polymers such as polyacrylics and polystyrenes to provide polymers for use in NLO devices. See for example WO 91/03504, which describes such acrylic polymers. Polymers which have relatively high glass transition temperatures are considered particularly useful.

SUMMARY OF THE INVENTION

This invention provides polymers containing NLO groups based upon a barbituric acid group, a thiobarbituric acid group or a 1,3-bis(dicyanomethylene)indan-2-ylidene group. Some of the polymers disclosed herein have unusually high glass transition points, making them particularly resistant to "relaxation" at higher temperatures. Polymers are provided in accordance with this invention which contain an NLO dye moiety selected from the group consisting of

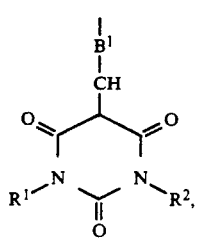

(Formula I)

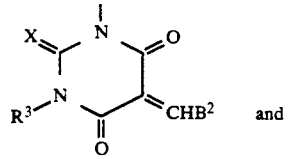

(Formula II)

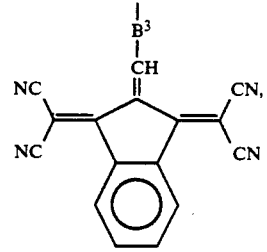

(Formula III)

wherein $B^1$ and $B^3$ are divalent electron donating groups, $B^2$ is a monovalent electron donating group, and X is O or S; and wherein each $R^1$, $R^2$ and $R^3$ is independently selected from hydrocarbyl groups and substituted hydrocarbyl groups containing from 1 to about 30 carbon atoms. This invention further provides a nonlinear optical element for transforming electromagnetic radiation comprising a poled polymer which contains an NLO dye moiety of Formula I, Formula II, or Formula III; and an NLO device employing said element in combination with means to direct at least one incident beam of electromagnetic radiation into the element.

This invention also provides polymers comprising the repeat unit

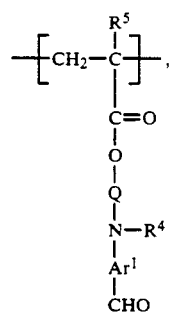

(Formula IV)

wherein $R^4$ is selected from alkyl groups containing from 1 to about 10 carbon atoms, $R^5$ is selected from hydrogen and methyl, Q is a hydrocarbylene group containing from 1 to about 10 carbon atoms (or $R^4$ and Q taken together are part of a ring structure) and $Ar^1$ is an arylene group containing from 6 to about 14 carbon atoms. Polymers comprising the repeat unit of Formula IV are useful as intermediates for making NLO polymers having an NLO dye moiety.

DETAILS OF THE INVENTION

Nonlinear optical (i.e., NLO) dyes and dye moieties belong to a known class of materials characterized by their molecular hyperpolerizability. Generally the NLO dye moieties employed in this invention have a molecular hyperpolarizability ("beta") of greater than about $10^{-030}$ electrostatic units (esu) measured by conventional EFISH methods, as described in L. T. Cheng, et al., SPIE, vol. 1147, p. 61-72 (1989) which is hereby incorporated herein by reference. NLO dyes often have three subunits, arranged A-E-D where A is an electron acceptor group (e.g., cyano, nitro, or perfluoroalkylsulfonyl), D is an electron donor group (e.g., amino or alkoxy), and E is a group having a conjugated pi bond system. These groups are arranged within the dye so that it has noncentrosymmetric molecular dipoles having an electron donor group linked through a pi-bonding system to an electron acceptor group. Such NLO dyes and their structural requirements, are well known to those skilled in the art, see for example L. T. Cheng et al., supra, and J. F. Nicoud et al., in D. S. Chemla and J. Zyss, Ed, Nonlinear Optical Properties of Organic Molecules and Crystals, Vol. 1, Academic Press, New York, 1987, p. 227-296.

This invention provides polymers which contain NLO dye moieties. The NLO dye moieties which are present in this invention are either monovalent or divalent. NLO dye moieties which are monovalent, including Formula I, Formula II and Formula III above, are present in the polymers as side chains (i.e., as groups pendant from the main polymer chains, or even pendant from a grouping which crosslinks the polymer). Those moieties which are divalent are present in the polymer as part of the main chain or as part of the crosslinks which connect main chains to each other.

Preferred polymers comprise the repeat unit

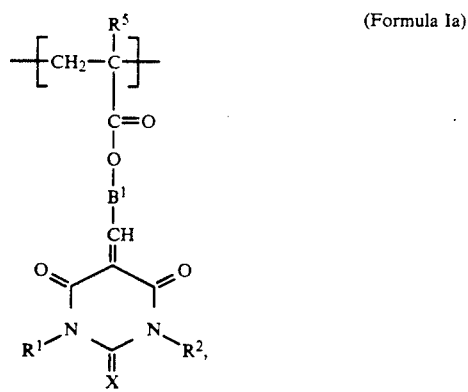
(Formula Ia)

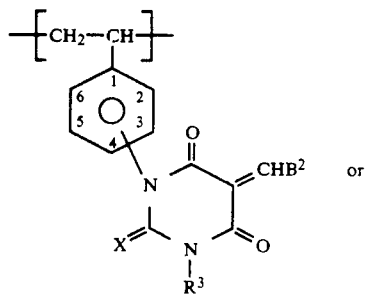
(Formula IIa)

or

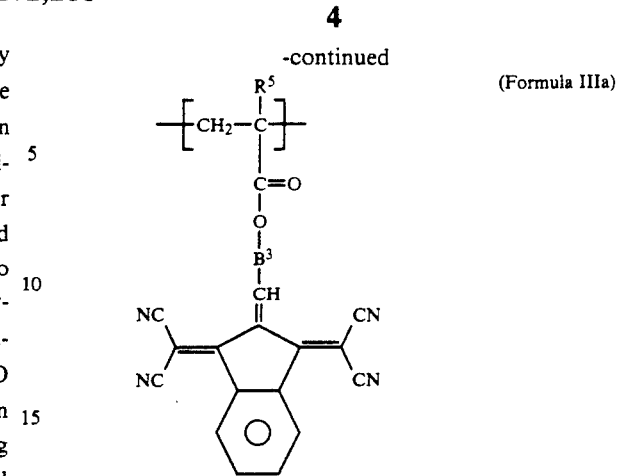
(Formula IIIa)

wherein $B^1$, $B^2$, $B^3$, X, $R^1$, $R^2$, $R^3$ and $R^5$ are as defined herein. By the term "comprise the repeat unit" immediately above is meant that the polymer that contains these repeat units may be made exclusively of these units or be a copolymer with other units, and the other units may or may not contain NLO dyes themselves. It will be recognized that Ia and IIIa are (meth)acrylic repeat units (i.e., acrylic or methacrylic repeat units) and IIa is a styrene repeat unit. Thus copolymers of Ia and IIIa with other acrylic monomers, particularly (meth)acrylic esters, are preferred, and copolymers of IIa with other styrene monomers are preferred. Preferably, the repeat units which contain the NLO dye moieties of Formula I, Formula II or Formula III are at least about one mole percent of the repeat units in the polymer; and are more preferably at least about 25 mole percent of the polymer repeat units. Polymers in which essentially all of the repeat units contain NLO dye moieties of Formula I, Formula II or Formula III (i.e., homopolymers) are especially preferred.

Groups $R^1$, $R^2$ and $R^3$ are hydrocarbyl groups or substituted hydrocarbyl groups. As used herein, the term hydrocarbyl means a univalent radical containing only carbon and hydrogen. By substituted hydrocarbyl herein is meant hydrocarbyl containing substituents that do not interfere with the synthesis of the desired compound, and if on electron accepting moieties don't substantially reduce the electron accepting ability of the moiety. Such groups are known to the art skilled and include nitro, cyano, ether, ester, keto, halo, hydroxy, tertiary amino, sulfone, sulfide, and silyl. It also includes heterocyclic rings including pyridyl, furanyl, thiophenyl, etc. It is preferred if such substituents are electron accepting. Preferred $R^1$, $R^2$ and $R^3$ groups include alkyl groups containing 1 to 4 carbon atoms, phenyl, p-nitrophenyl, m-nitrophenyl, and cyanophenyl. In especially preferred NLO dye moieties $R^1$, $R^2$ and $R^3$ are independently selected from methyl, ethyl, phenyl, p-nitrophenyl, and m-nitrophenyl. Preferred combinations of $R^1$ and $R^2$ in Formula I and Formula Ia are both methyl, both ethyl, p-nitrophenyl and m-nitrophenyl, both phenyl, and p- or m-nitrophenyl and phenyl.

$R^4$ may be an alkyl group containing from 1 to about 10 carbon atoms. Preferred $R^4$ groups include alkyl groups containing 1 to 4 carbon atoms. Methyl and ethyl are especially preferred. Q may be a hydrocarbylene group containing from 1 to about 10 carbon atoms. By hydrocarbylene herein is meant a divalent radical containing only carbon and hydrogen. Preferred Q groups include 1,2-ethylene. Alternatively, $R^4$ and Q may together form a ring structure. Typically, such rings contain from 4 to about 10 ring atoms, total, of carbon and nitrogen, or of carbon, nitrogen and oxygen. For example, $R^4$ and Q may together form N,N-pyrrolidenyl. $Ar^1$ is an arylene group containing from 6 to about 14 carbon atoms. Preferred $Ar^1$ groups include phenylene. $R^5$ is hydrogen or methyl.

In the NLO dye moieties, the electron acceptor group is a (thio)barbituric acid grouping or the 1,3-bis(dicyanomethylene)indan-2-ylidene grouping. X is either oxygen or sulfur. The electron donating group is $B^1$, $B^2$ or $B^3$. As is well known in the art, the electron donating groups must be conjugated with the electron acceptor groups. Preferred $B^1$ and $B^3$ electron donating groups include

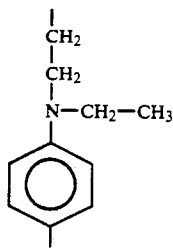

Preferred $B^2$ electron donating groups include aminophenyl, N-alkylaminophenyl, N,N-dialkylaminophenyl, hydroxyphenyl, alkoxyphenyl, alkylthiophenyl, bromophenyl, thiolphenyl, phenyl,

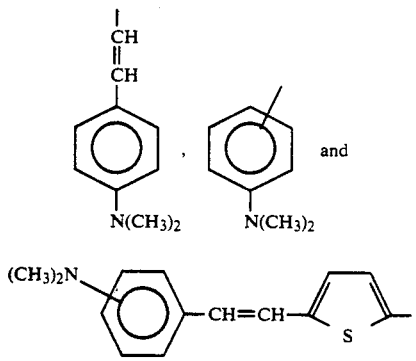

The above groups $B^1$, $B^2$ and $B^3$ may be connected to the polymer through other groups that maintain the conjugated nature of the moiety such as $-(CH_2=CH_2-)_z-$ (where z is 1 to 4) and $-(N=N)-$. These connecting groups could then also be considered part of $B^1$, $B^2$ or $B^3$.

The polymers of this invention which have a glass transition temperature (Tg) of at least about 160° C. are considered especially useful.

The NLO dye moieties of Formula I, Formula Ia, Formula II, and Formula IIa all contain (thio)barbituric acid groups (i.e., a barbituric acid group or a thiobarbituric acid group). It is preferred in all of the moieties if X is sulfur. Synthesis of the barbituric acid (where X is O) and thiobarbituric acid (where X is S) compounds are made in analogous ways. When appropriate, one can start with the barbituric acid or thiobarbituric acid. In cases where the (thio)barbituric acid ring is formed during the synthesis or after polymerization, "equivalent" sulfur containing or oxygen containing reagents may be used, such as isocyanates (to make X oxygen) and isothiocyanates (to make X sulfur). The NLO dye moiety III, and repeat unit IIIa, can be made as illustrated in Example 15. As shown in the Examples, the (thio)barbituric acid moiety can first be attached to a monomer which is later polymerized, or it can be attached to the appropriate repeat units after the polymer has formed.

For example, one process for making an acrylic ester polymer which has a side chain which includes an NLO dye moiety with a (thio)barbituric acid electron acceptor, comprises reacting a polymer containing the repeat unit

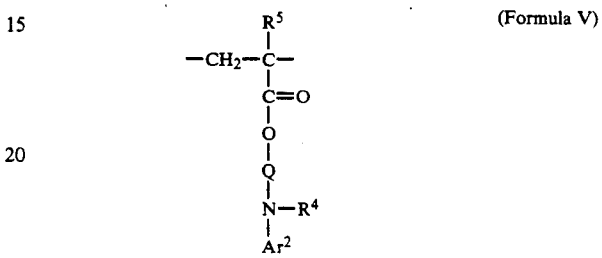

(Formula V)

wherein Q is alkylene containing 1 to 10 carbon atoms, $Ar^2$ is aryl containing 6 to 14 carbon atoms, and $R^4$ and $R^5$ are as defined above, with $POCl_3$ and N,N-dimethylformamide (DMF) to formylate the $Ar^2$ group of the polymer to form a formylated polymer; and reacting the formylated polymer with a compound of the formula

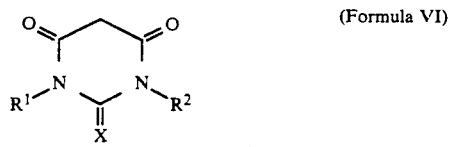

(Formula VI)

wherein $R^1$, $R^2$ and X are as defined above.

The first step of this process can be carried out from about $-20°$ C. to about 120° C., and the second step can be carried out at room temperature, although in both instances, the temperature is not critical. It is preferred to carry out the reaction in solution, and DMF is a convenient solvent. Preferred groups $R^1$, $R^2$, $R^4$ and $R^5$ are as defined above. A preferred Q is 1,2-ethylene, and a preferred $Ar^2$ is phenyl.

This invention also includes a process for making a nonlinear optical element. A typical form for an NLO element is a film, so a film may be formed by evaporating the solvent from a solution of the NLO dye moiety containing polymer. A film may be formed by spin coating or forming a film with a doctor knife.

It is usually desirable to obtain as high a concentration of NLO dye moiety in the polymer as possible, so this should be kept in mind when making the polymer. In order to avoid the necessity of removing large volumes of solvents, it is desirable to use relatively high concentrations of polymer, but other factors such as the solution viscosity due to the polymer can place a practical upper limit on the concentrations that are conviently used. Temperature is not critical, although elevated temperatures may be needed to dissolve the polymer.

Another step of the process involves aligning the NLO dye molecules in conformance with an externally applied electric field. This alignment may be carried out simultaneously with the evaporation of solvent or after the solvent is removed. Substantially locking the NLO dye molecules in a biased alignment is referred to as poling. Poling can be carried out by subjecting the polymer to an electric field. It is preferred to align when the dye molecules are relatively mobile, as when solvent has not been completely removed and/or at elevated temperatures (e.g., above about 120° C.; but below the temperature at which significant NLO dye degradation or sublimation takes place). Preferably poling is accomplished above the Tg of the polymer. The alignment can be "locked in" by continuing to apply the electric field until the mobility of the NLO dye molecules is reduced, as by removal of all solvent and/or cooling the polymer.

An electric field for poling is commonly provided by either corona poling or electrode poling. In electrode poling the electric field is created between two closely spaced electrodes. Depending on the desired sample configuration, these electrodes can either be in the plane of a thin film, in which case the field is primarily parallel to the surface of the sample; or it can be in a plane above and below the sample, in which case the field is perpendicular to the sample surface. The latter configuration has the advantage of generating high fields over a large area, but has the disadvantage for frequency doubling of requiring that the electrodes are transparent (transparency required only to measure transmitted SHG light) and that the sample is tilted with respect to the input beam. This latter requirement is necessary so that a component of the fundamental beam's electric field can be parallel to the poling direction.

Electrode poling has several disadvantages, particularly when surveying a large number of new materials where the thin film quality and characteristics have not been optimized. Because of the high fields involved, electrochemistry can take place at the electrodes, thereby altering material properties. Also microscopic defects can lead to electrical breakdown at potentials many times smaller than a defect-free film could sustain. Such a breakdown will typically ruin a sample since the entire charge contained on the electrodes will flow through a small area of the sample causing thermal damage not only to the sample but also to the electrodes.

Corona poling avoids these disadvantages. A corona discharge is used to create the electric field by depositing charge on a thin film sample which has been coated on a conductive substrate. Corona poling eliminates the high voltage electrode. Since there is no conductive electrode to carry charge to a defect, the catastrophic damage associated with having a conductive point defect is also eliminated. This technique does, however, have the limitations of requiring a transparent (transparency required only to measure transmitted SHG light) electrode and a tilted sample. In addition, since a corona discharge is a current limited source, modest sample conductivity will cause a reduction in the maximum field which can be generated. For a discussion of corona poling, see, e.g., K. D. Singer et al., "Electro-optic phase modulation and optical second harmonic generation in corona-poled polymer films", Appl. Phys. Lett. 53(19) pp. 1800-1802 (1988).

This invention provides compositions comprising at least one NLO polymer containing an NLO dye moiety of Formula I, Formula II and/or Formula III which has been poled. The poled NLO polymers of this invention are considered particularly useful because of their high concentration of nonlinear optically active molecules, their capability of being formed into large area thin films, and their high orientational stability. Preferred film thickness can vary according to use. Typically film thickness is within the range of 0.5 $\mu$m-2 $\mu$m.

The poled polymers can also be provided in forms other than films (e.g., a solid block of polymer could be formed into an electrooptic modulator or a frequency converter using conventional techniques known in the art for single crystals) and poled polymers in various forms are included within this invention.

The poled polymers of this invention are preferably shaped to function as nonlinear optical elements for transforming electromagnetic radiation (e.g., by changing the frequency and/or polarization of the radiation). Generally, the nonlinear optical element of a poled polymer is used for transforming electromagnetic radiation by including it within an optical device. A device for transforming electromagnetic radiation using a nonlinear optical element is described in U.S. Pat. No. 4,909,964 which is hereby incorporated in its entirety herein by reference. The present invention may be used in such a device.

A conventional nonlinear optical device disclosed in U.S. Pat. No. 4,909,964 comprises means to direct at least one incident beam of electromagnetic radiation into an element. The element has nonlinear optical properties whereby electromagnetic radiation emerging from the element contains at least one frequency different from the frequency of any incident beam of radiation. The different frequency is an even multiple of the frequency of one incident beam of electromagnetic radiation.

Preferably, the emerging radiation of a different frequency is doubled (second-order) (SHG). Preferably, the electromagnetic radiation is radiation from one of a number of common lasers, such as Nd-YAG, Raman-shifted Nd-YAG, Nd-YLF or Nd-glass, semiconductor diode, Er-Glass, Ti-Sapphire, dye, and Ar or Kr ion, or radiation shifted to other frequencies by nonlinear processes. For example, polarized light of wavelength 1.06 $\mu$m from an Nd-YAG laser is incident on the optical element along the optical path. A lens focuses the light into the optical element. Light emerging from the optical element is collimated by a similar lens and passed through a filter adapted to remove light of wavelength 1.06 $\mu$m while passing light of wavelength 0.53 $\mu$m.

As disclosed in U.S. Pat. No. 4,909,964, one conventional electro-optic modulator comprises means to direct a coherent beam into an optical element, and means to apply an electric field to the element in a direction to modify the transmission property of the beam. For example, in an electro-optic modulator comprising an optical element, a pair of electrodes is attached to the upper and lower surfaces of the element, across which a modulating electric field is applied from a conventional voltage source. The optical element is placed between two polarizers. A light beam (such as that from a Nd-YAG laser) is polarized by a polarizer, focused on the optical element and propagated therethrough, and subjected to modulation by the electric field. The modulate light beam is led out through an analyzer polarizer. Linearly polarized light traversing the optical element is rendered elliptically polarized by action of the applied modulating voltage. The analyzer polarizer renders the polarization linear again. Application of the modulating voltage alters the birefringence of the optical element and consequently the ellipticity impressed on the beam. The analyzer polarizer then passes a greater or lesser fraction of the light beam as more or less of the elliptically polarized light projects onto its nonblocking polarization direction.

It will be further apparent to those skilled in the art that the optical elements formed by the poled polymers of the present invention are useful in this and other devices utilizing their nonlinear properties, such as devices utilizing the electro-optic effect.

In the following examples, poling was induced and measurement of second harmonic generation (SHG) was done by the general method described in Example 7. Polymer films coated on ITO glass were poled in a positive corona at temperatures up to 30° C. above their Tg. The poling induced dipolar alignment can be monitored with SHG measurements.

By cooling below the Tg in the presence of a poling field, the dipolar alignment is "frozen" in. Of great concern is the temporal stability of this alignment, and hence the stability of the NLO activity, at application temperatures which may be substantially above ambient. A thermal depoling experiment, in which the randomization of the dipolar alignment is monitored through SHG as a function of temperature is a convenient method to measure an "orientational Tg", above which the orientational mobilities of the NLO dye moieties goes from solid-like (frozen in) to liquid like (mobile) behavior. One method of determining the "orientational Tg" is to heat the poled polymer at a constant rate (constant temperature rise per unit time) while measuring the $d_{33}$ signal of the poled polymer. This signal decreases rapidly as Tg is approached, due to increasing mobility (randomization) of the NLO dye moieties. Straight lines are then drawn through the low temperature (much below Tg) and high temperature (approaching, at, or above Tg—this is the section of the plot where $d_{33}$ is decreasing rapidly to O) sections of the plot, and the intercept of these lines is taken as the orientational Tg. Orientational Tg measured by the method is usually somewhat lower than that measured by Differential Scanning Calorimetry, a more common measurement method.

EXAMPLES

Example 1

Reaction of methacryloyl chloride with N-ethyl-N-(β-hydroxyethyl)aniline: Monomer 1

To 25 ml of THF were added 1.021 g of N-ethyl-N-(β-hydroxyethyl)aniline, 1.252 g of triethylamine, 20 mg of 4-dimethylaminopyridine and 10 mg of hydroquinone. This mixture was cooled to −78° C. and 1.294 g of methacryloyl chloride in 5 ml THF was added. The mixture was stirred at −78° C. for 1 hr and then warmed to room temperature and stirred under static air for two days. Solvent was removed by rotary evaporation and the residue chromatographed on silica gel eluted with $CH_2Cl_2$ to give 0.874 g of the desired acrylate. $^1H$ nmr (CDCl3): 7.2 (m,2H), 6.8 (m,2H), 6.7 (m,1H), 6.1 (m,1H), 5.6 (m,1H), 4.3 (t,2H), 3.6 (t,2H), 3.4 (q,2H), 1.9 (m,3H), 1.2 (t,3H).

Example 2

Co-polymerization of Monomer 1 with MMA

To 10 ml of THF were added 0.800 g of the product of Example 1, 0.343 g of methyl methacrylate and 20 mg of 2,2′-azobis(isobutyronitrile). The mixture was refluxed for two days and concentrated by rotary evaporation. MeOH was added to precipitate the polymer to give 0.963 g of off-white solid. $M_w=73800$, $M_n=11500$.

Example 3

Formylation of Copolymer

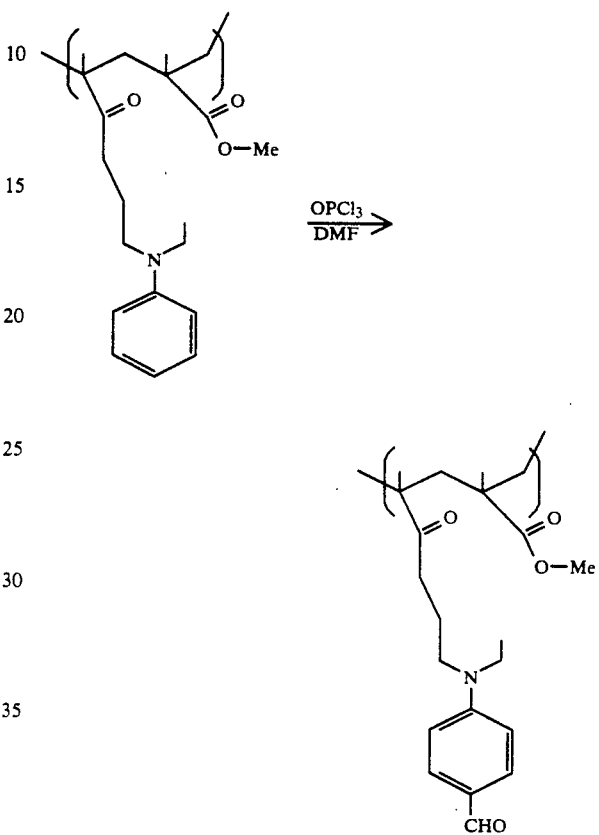

To 314 mg of phosphorous oxychloride was added 0.55 ml of DMF and the mixture stirred for 1 hr. This mixture was added to 712 mg of the polymer of Example 2 (polymer was placed in a 25 ml Schlenk flask and chilled in a −20° C. freezer in the dry box before addition of DMF mixture). One ml of DMF was added to facililate stirring. The mixture was heated at 100° C. for 2 hrs. Water was added (15 ml) and the mixture was neutralized to pH 7 with saturated NaOAc solution. The polymer was filtered, washed with water and vacuum dried to give 0.641 g of the desired formylated polymer. $^1H$ nmr ($CD_2Cl_2$) indicated complete conversion to the aldehyde: 9.8 (s,1H), 7.6 (s,2H) and 6.7 (s,2H) along with broad resonances at 4.0, 3.5, 1.9, 1.2, 1.0 and 0.8 ppm.

Example 4

Homopolymer derived from Monomer 1

To 2.213 g of Monomer 1 and 30 mg of 2,2′-azobis-(isobutyronitrile) were dissolved in 25 ml of THF and the mixture refluxed for 3 days under nitrogen. Workup was the same as for the copolymer to give 2.105 g of the homopolymer as a light yellow solid. $M_w=31900$, $M_n=2980$.

Example 5

Formylation of Polymer of Example 4

Procedure was similar to that of Example 3. From 1.942 g of polymer was obtained 2.132 g of the formylated polymer. $^1$H nmr indicates that all phenyl groups have been formylated. This homopolymer will be denoted as Homopolymer 1.

Example 6

Reaction of 1,3-diethy-2-thiobarbituric acid and the polymer of Example 5

The polymer of Example 5 (500 mg) was added to 10 ml of acetic anhydride. Thus obtained was a yellow solution with a greenish gummy mass. The gummy material was transferred to another flask and dissolved in 2 ml of DMF. To this solution was added 0.2 g of 1,3-diethyl-2-thiobarbituric acid. The mixture was stirred at room temperature for two days and then poured into 40 ml of EtOH. The polymer was filtered and washed with EtOH to give 423 mg of product. DSC indicates a Tg of around 137° C. $M_w=61100$, $M_n=30500$. $^1$H nmr in CDCl$_3$ indicates the absence of aldehyde groups.

Example 7

Reaction of the polymer of Example 5 with 1,3-diethyl-2-thiobarbituric acid To 7 ml of DMF was added 500 mg of the polymer and 400 mg of 1,3-diethyl-2-thiobarbituric acid. The mixture was heated at 50° C. for 4 hours and then stirred overnight at room temperature overnight. EtOH was added to precipitate out the product to give 0.844 g of product. DSC indicated a Tg of about 125° C. $M_w=73900$, $M_n=29200$.

A 5% wt solution of the polymer was prepared in CHCl$_3$. The solution was filtered through a 0.45 μm filter and spin-coated onto an ITO coated glass substrate at a spinning rate of about 1000 rpm. Drying at 130° C. for 10 minutes resulted in a 0.45 μm thick film. The film was placed on a corona poling apparatus consisting of a heating stage and a high voltage wire. The heating stage was positioned at 45° angle with respect to a polarized, CW pumped, Q-switched, and mode-locked Nd:YAG laser beam operating at 1 kHz and producing trains of 100 picosecond light pulses at a wavelength of 1.061 μm. A second harmonic generation experiment was used to monitor the poling process and to measure the optical nonlinearity of the poled polymer film. The high voltage wire was suspended about 1 cm above the polymer film and a typical voltage of +7 kvolt was applied during poling. With the poling field applied, the polymer film was heated at a rate of 12° C./min. to a maximum temperature of 130° C. The film was then cooled at a rate of about 12° C./min. to room temperature. The poling field was turned off and a second harmonic generation $d_{33}$ coefficient of 36 pm/v was deduced from SHG measurement after corrected for linear absorption. The polymer film was thermally depoled by raising the film temperature at a rate of 12° C./min. to a maximum temperature of 150° C. The orientational Tg was 105° C. The film was subsequently repoled and its orientational stability was monitored by SHG at both room temperature and at 100° C. $d_{33}$ was found to be quite stable at room temperature but decreased to zero within 24 hours at 100° C.

Example 8

1-(4-nitrophenyl)-3-phenyl-2-thiobarbituric acid

Procedure is similar to a literature procedure for preparing 1-aryl-3-(2-pyridyl)thiobarbiturates (A. Dhasmana, J.P. Barthwal, B.R. Pandey, B. Ali, K.P. Bhargava, and S.S. Parmar, *J. Heterocyclic Chem.*, 18, 635 (1981)).

In 20 ml of toluene were added 1.80 g of 4-nitrophenyl isothiocyanate and 1.033 g of aniline. The mixture was heated at 120° C. for ½ hour and the product was filtered to give 2.369 g of the desired thiourea.

All of this was mixed with 1.353 g of malonic acid and 7 ml of acetyl chloride was added. This mixture was slowly heated to 65° C. 50 ml of water was added and the mixture was extracted with 4×75 ml of CHCl$_3$. The organic layer was washed with 20 ml of water and dried over Na$_2$SO$_4$. The solvent was removed and the residue recrystallized from hot toluene to give 1.382 g of the desired thiobarbituric acid. $^1$H nmr (CD$_2$Cl$_2$): 8.3 (m,2H), 7.5 (m,5H), 7.2 (m,2H), 4.2 (s,2H).

Example 9

Reaction of the polymer of Example 5 with 1-(4-nitrophenyl)-3-phenyl-2-thiobarbituric acid In 6 ml of DMF were added 526 mg of the polymer and 339 mg of the product of Example 8. The mixture was stirred overnight and EtOH added to give 1.110 g of product. $M_w=64300$, $M_n=15400$. $^1$H nmr in DMSO-d$_6$ indicates the absence of aldehyde groups.

A 15% wt solution of the polymer was prepared in DMF. The solution was filtered through a 0.45 μm filter and spin-coated onto an ITO coated glass substrate at a spinning rate of about 1000 rpm for 2 minutes. Drying at 150° C. for 10 minutes resulted in a 1.051 μm thick film. The film was poled to a maximum temperature of 225° C. with a wire voltage of 9 kvolt. A depoling run found an orientational Tg of 180° C. Temporal stability of the optical nonlinearity was found to be excellent with a 10% decrease over a three month period with the film stored at 100° C.

Example 10

Formylation of 4.578 g of Homopolymer 1 (derived from 5.596 g of Monomer 1, 50 mg of 2,2'-azobis-(isobutyronitrile) in 40 ml THF) gave a polymer with $M_w=9040$, $M_n=6150$.

Example 11

Repeat of Example 9

The polymer of Example 10 (130 mg) and 163 g of 1-(4-nitrophenyl)-3-phenyl-2-thiobarbituric acid gave 226 g of the desired polymer. $M_w=55900$, $M_n=17600$.

Example 12

Reaction of the polymer of Example 10 with 1,3-diphenyl-2-thiobarbituric acid In 2 ml of DMF were added 500 mg of polymer and 547 mg of 1,3-diphenyl-2-thiobarbituric acid. After stirring the mixture overnight and precipatiting out the product with EtOH was obtained 0.922 g of product.

A 15% wt solution of the polymer was prepared in DMF. The solution was filtered and a film was spin-coated onto an ITO coated glass substrate. The film was poled to a maximum temperature of 240° C. A depoling run found an orientational Tg of 185° C.

Example 13

Reaction of Homopolymer 1 derived from acrylate 1 and 1-(4-nitrophenyl)-3-(3-nitrophenyl)-2-thiobarbituric acid Preparation of Homopolymer 1:

Monomer 1 (4.945 g) in 40 ml of THF with 50 mg of 2,2'-azobis(isobutyronitrile) were refluxed for 2 days under nitrogen. $M_w=7660$; $M_n=1210$. Treatment of 1.041 g of above polymer with $OPCl_3$/DMF gave Homopolymer 1 with $M_w=9810$; $M_n=5830$.

1-(4-Nitrophenyl)-3-(3-nitrophenyl)-2-thiobarbituric acid was prepared similarly to the preparation of 1-(4-nitrophenyl)-3-phenyl-2-thiobarbituric acid. The thiourea was prepared from the reaction of 3-nitroaniline with 4 nitrophenyl isothiocyanate. Then 300 mg of 1-(4-nitrophenyl)-3-(3-nitrophenyl)-2-thiobarbituric acid and 200 mg of the homopolymer were stirred in 1–5 ml of DMF overnight. Ethanol was added and the polymer filtered and washed with ethanol to give 415 mg of polymer as a red solid. $M_w=48700$, $M_n=10700$.

A 15% wt solution of the polymer was prepared in DMF. The solution was filtered and a film was spin-coated onto an ITO coated glass substrate. The film was poled to a maximum temperature of 220° C. Depoling run found an orientational Tg of 190° C.

Example 14

Reaction of copolymer derived from Monomer 1 and MMA and 1,3-diphenyl-2-thiobarbituric acid Another preparation of copolymer (similar to Example 3):

0.821 g of monomer 1, 0.352 g of MMA, 20 mg of 2,2'-azobis(isobutyronitrile) in 10 ml THF were refluxed under nitrogen for 2 days to give a copolymer. Then 0.898 g of this polymer was treated with $OPCl_3$/DMF to give 0.969 g of copolymer (similar to Example 3) with $M_w=17300$, $M_n=8140$.

Then 500 mg of this copolymer and 400 mg of 1,3-diphenyl-2-thiobarbituric acid was stirred in 2 ml of DMF overnight. Ethanol was added and the polymer filtered and washed with ethanol to give 819 mg of copolymer. $M_w=69800$, $M_n=14000$.

A 15% wt solution of the polymer was prepared in DMF. The solution was filtered and a film was spin-coated onto an ITO coated glass substrate. The film was poled to a maximum temperature of 220° C. A depoling run found an orientational Tg of 170° C.

Example 15

Reaction of polymer of Example 3 and tetracvano acceptor

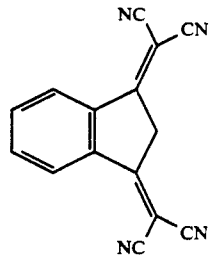

The acceptor was prepared by a literature procedure (J. Chem. Soc., Perkin Trans. II, 1987, 815).

Using procedures similar to those in Example 2 and Example 3, a copolymer of the same general composition of Example 3 was made.

Then 1.023 g of the copolymer and 0.686 g of the acceptor were reacted in acetic anhydride overnight at 48° C. and gave 0.561 g of the desired polymer. $M_w=32900$, $M_n=27700$. Orientational Tg was 155° C.

Styrene Polymers

Styrene polymers are prepared as shown below:

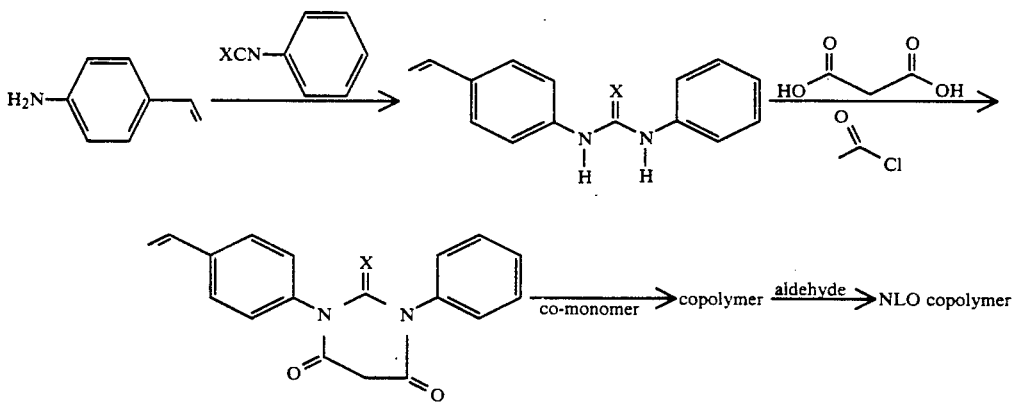

Example 16

Reaction of p-aminostyrene and phenylisothiocyante p-Aminostyrene (1.19 g) and 1.35 g of phenylisothiocyanate were mixed in 20 ml of toluene and heated at 100° C. for 2 hrs. The product was filtered and washed with a little toluene to give 1.269 g of the thiourea as a light yellow solid. $^1H$ nmr ($CDCl_3$): 7.8 (broad,2H), 7.4 (m,9H), 6.7 (dd,1H), 5.75 (d,H), 5.3 (d,1H). The above thiourea (0.613 g), 0.376 g of malonic acid and 2 ml of acetyl choride were mixed and heated slowly to 80° C. After an hour at 80° C., water was added and the product filtered. Thus obtained was 0.872 g of product as a peach colored solid. This material was used without further purification.

Example 17

The product of Example 16 (0.402 g), 5 mg of 2,2'-azobis(isobutyronitrile) in 10 ml of THF were refluxed two days under nitrogen. The polymer was precipitated with EtOH. Solvent was removed from the filtrate and the residue submitted for molecular weight determination by GPC. $M_w=9500$; $M_n=7310$. $Tg=83°$ C.

Example 18

Copolymer of
1-(4-vinylphenyl)-3-phenyl-2-thiobarbituric acid and styrene

A product prepared using the procedure of Example 16 (0.500 g), 0.162 g of styrene, 50 mg of 2,2'-azobis-(isobutyronitrile) were combined in 10 ml of THF. The mixture was refluxed overnight and EtOH added. The solvent was removed and the residue was treated with CHCl$_3$/hexane to give 0.656 g of yellow/brown solid. The solvent was removed from the filtrate to give 0.668 g of a yellow/brown solid.

Example 19

Reaction of Copolymer of
1-(4-vinylphenyl)-3-phenyl-2-thiobarbituric acid and styrene with N,N-dimethylaminocinnamaldehyde The second polymer isolated in Example 18 (0.657 g) and 0.200 g of N,N-dimethylaminocinnamaldehyde were added to 7 ml of DMF. The mixture was stirred at room temperature for 1 hour and then 60° C. for 1 hour. Solvent was removed and ethanol added. The resulting solid was filtered to give 0.275 g of product. $M_w=22300$, $M_n=11100$.

15 wt % solution of polymer was prepared in DMF. The solution was filtered and a film was spin-coated onto an ITO coated glass substrate. The film was poled to a maximum temperature of 130° C. A depoling run found an orientational Tg of 103° C.

Example 20

Copolymer of
1-(4-vinylphenyl)-3-phenyl-2-thiobarbituric acid and N-phenylmaleimide 1-(4-Vinylphenyl)-3-phenyl-2-thiobarbituric acid (1.0 g) and 200 mg of N-phenylmaleimide and 27 mg of 2,2'-azobis(isobutyronitrile) were combined in 16 ml of THF and the mixture refluxed overnight under nitrogen. EtOH was added to precipitate out the product which was filtered, washed with EtOH and vacuum dried to give 0.438 g of the product.

Example 21

Copolymer of
1-(4-vinylphenyl)-3-phenyl-2-thiobarbituric acid and N-phenylmaleimide with
4-N,N-dimethylaminobenzaldehyde The polymer of Example 20 (438 g) and 100 mg of 4-N,N-dimethylaminobenzaldehyde were mixed in 2 ml of DMF. After stirring overnight at room temperature, the product was precipitated with EtOH to give 355 mg of product.

A 15% wt solution of polymer was prepared in DMF. The solution was filtered and a film was spin-coated onto an ITO coated glass substrate. The film was poled to a maximum temperature of 220° C. A depoling run found an orientational Tg of 170° C. The orientational transition was quite broad indicating a broad distribution of orientational relaxation times due to crosslinking.

Example 22

Copolymer of
1-(4-vinylpheny)-3-phenyl-2-thiobarbituric acid and N-phenylmaleimide 1-(4-Vinylphenyl)-3-phenyl-2-thiobarbituric acid (1.04 g) and 0.508 g of N-phenylmaleimide and 20 mg of 2,2'-azobis(isobutyronitrile) combined in 15 ml of THF and the mixture was refluxed under nitrogen overnight. EtOH was added to precipitate out the product which was filtered, washed with EtOH and vacuum dried to give 0.664 g of the product. Tg by DSC of 177° C. $M_w=32500$, $M_n=13800$.

Example 23

Reaction of Copolymer of
1-(4-vinylpheny)-3-phenyl-2-thiobarbituric acid and N-phenylmaleimide with
5-[2-(4-N,N-dimethylaminophenyl)vinyl]thiphene-2-carbaldehyde The copolymer of Example 22 (200 mg) and 100 mg of the aldehyde were mixed in 2-3 ml of DMF. After stirring overnight at room temperature, the product was precipitated with EtOH to give 202 mg of product. Tg (DSC): 178.5° C.

Example 24

Reaction of 5-bromo-2-thiophenecarboxaldehyde with 4-dimethylaminostyrene

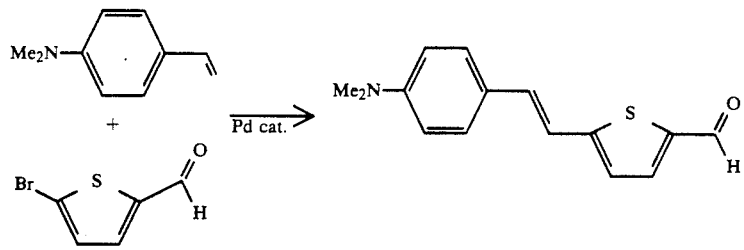

The cross-coupling of 5-bromo-2-thiophenecarboxaldehyde with 4-(N,N-dimethylamino)phenylethene was performed according to a similar procedure described in W. C. Frank, Y. C. Kim, and R. F. Heck, J. Org. Chem., 43, 2947 (1978). 5-Bromo-2-thiophene-carboxaldehyde (0.863 g, 4.52 mmoles) 0.865 g (5.88 mmoles) of 4-(N,N-dimethylamino)phenylethene, 10 mg (0.045 mmoles) of palladium acetate and 28 mg (0.09 mmoles) of tri-o-tolylphosphine were placed in 1 ml of NEt$_3$. The mixture was placed in a 100° C. bath for three days; the reaction was kept under nitrogen. To the mixture was added 25 ml of water and the mixture was extracted 4×50 ml of CH$_2$Cl$_2$. The organic extract was washed with 2×10 ml of water and then dried over Na$_2$SO$_4$. The solution was filtered, solvent removed by rotary evaporation and the residue chromatographed on silica gel eluted with $CH_2Cl_2$. A yellow band was collected to give 0.494 g of the desired coupled product as a mixture of cis-trans isomers. Elemental analysis: calculated for $C_{15}H_{15}NOS$: C: 70.01; H: 5.88; found: C: 69.87; H: 5.83.

To 10 ml of EtOH was added 162 mg of the above aldehyde, 128 mg of 1,3-diethyl-2-thiobarbituric acid, 5 drops of piperidine and the mixture refluxed for 4 hours. The product was filtered, washed with EtOH to give 264 mg of the desired product as a green solid. Mp: soften at 253° C., melts at 279°–280° C. Elemental analysis calculated for $C_{23}H_{23}N_3O_2S_2$: C: 62.84; H: 5.73; found: C: 62.90; H: 5.51. $^1H$ nmr ($CD_2Cl_2$): 8.58 (s,1H), 7.82 (d,J=4 Hz,1H), 7.46 (AB d,2H), 7.38 (d,J=16 Hz,1H), 7.24(d, J=4 Hz,1H), 7.10 (J =16 Hz,1H), 6.71 (AB d,2H), 4.58 (q,J=7 Hz,2H), 4.55 (d,J=7 Hz,2H), 1.32 (t,J=7 Hz,3H), 1.28 (t,J=7 Hz,3H).

Example 25

Reaction of Copolymer of 1-(4-vinylphenyl)-3-phenyl-2-thiobarbituric acid and N-phenylmaleimide with N,N-dimethylaminocinnamaldehyde The copolymer of Example 22 (200 mg) and 70 mg of N,N-dimethylaminocinnamaldehyde were combined in 1 ml of DMF. Workup as in Example 23 gave 191 mg of product.

Example 26

Thiourea from p-aminostyrene and 4-nitrophenylisothiocyante p-Aminostyrene (1.201 g) and 1.816 g of 4-nitrophenylisothiocyanate in 25 ml of toluene was heated at 100° C. for 2 hours. The product was filtered and washed with toluene to give 2.45 g of yellow solid. $^1H$ nmr (THF- d8): 9.6 (s,1H), 9.4 (s,1H), 8.1 (m,2H), 7.8 (m,2H), 7.4 (s,4H), 6.7 (dd,1H), 5.7 (d,1H), 5.15 (d,1H).

Example 27

Reaction of the thiourea of Example 26 with malonic acid

The thiourea of Example 26 (2.45 g), 4.34 g of malonic acid and 7 ml of acetyl chloride were heated slowly to 80° C. and kept at 80° C. for an hour. Water was added and the product was collected to give 3.995 g of tan solid. This material was used without further purification.

Example 28

1-(4-Nitrophenyl)-3-(4-vinylphenyl)-2-thiobarbituric acid (0.519 g) and 0.148 g of styrene and 5 mg of 2,2'-azobis(isobutyronitrile) were combined in 10 ml of toluene and the mixture refluxed overnight. EtOH was added to give 0.497 g of product.

The above copolymer (291 mg) and 100 mg of N,N-dimethylaminobenzaldehyde were combined in about 1.5 ml of DMF and the mixture stirred overnight at room temperature. Addition of EtOH gave 184 mg of the copolymer.

A 15% wt solution of this copolymer was prepared in DMF. The solution was filtered and a film was spin-coated onto an ITO coated glass substrate. The film was poled to a maximum temperature of 180° C. Depoling run found an orientational Tg of 128° C.

Example 29

Reaction of thiobarbituric acid of Example 16 with homopolymer 1

Homopolymer 1 (400 mg, $M_w$=9040; $M_n$=6150) and 450 mg of thiobarbituric acid of Example 16 were stirred in 2 ml of DMF overnight. The polymer was precipitated by adding ethanol. Tg (DSC)=181° C. while orientational Tg was found to be 122° C. This indicated that additional crosslinking had occurred during the DSC measurement.

Particular embodiments of the invention are included in the Examples. Other embodiments will become apparent to those skilled in the art from a consideration of the specification or practice of the invention. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the claims.

What is claimed is:

1. A polymer containing NLO dye moieties selected from the group comprising of

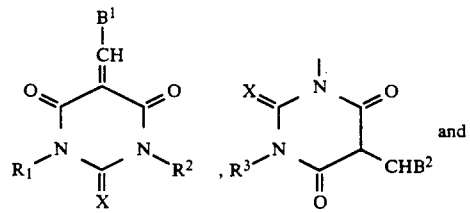

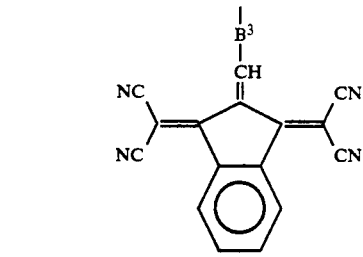

wherein $B^1$ and $B^3$ are divalent electron donating groups, $B^2$ is a monovalent electron donating group, and X is O or S; and wherein each $R^1$, $R^2$ and $R^3$ is independently selected from the group consisting of hydrocarbyl groups and substituted hydrocarbyl groups which contain from 1 to about 30 carbon atoms.

2. A polymer in accordance with claim 1 which comprises the repeat unit

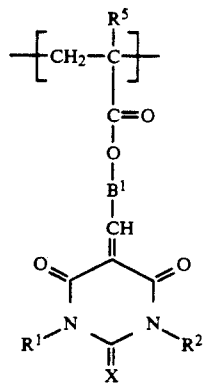

wherein $R^5$ is hydrogen or methyl.

3. A polymer in accordance with claim 1 or claim 2 wherein $R^1$ and $R^2$ are both methyl, both ethyl, p-nitrophenyl and m-nitrophenyl, both phenyl, phenyl and p-nitrophenyl, or phenyl and m-nitrophenyl.

4. A polymer in accordance with claim 1 which comprises the repeat unit

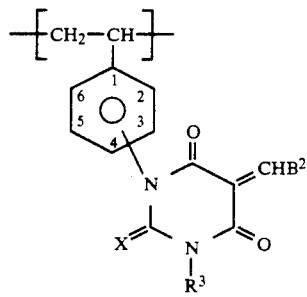

5. A polymer in accordance with claim 1, claim 2 or claim 4 wherein X is sulfur.

6. A polymer in accordance with claim 1, claim 2 or claim 4 wherein $R^1$, $R^2$ and $R^3$, when present, are independently selected from the group consisting of methyl, ethyl, phenyl, p-nitrophenyl, m-nitrophenyl, and cyanophenyl.

7. A polymer in accordance with claim 1 which comprises the repeat unit.

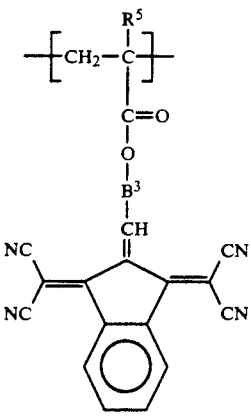

wherein $R^5$ is hydrogen or methyl.

8. A polymer in accordance with claim 1, claim 2, claim 4 or claim 7 wherein said NLO dye moiety is aligned in conformance with an externally applied electric field.

9. A polymer in accordance with claim 1, claim 2, claim 4 or claim 7 which has a Tg of at least about 160° C.

10. A composition comprising a poled polymer of claim 1, claim 2, claim 4 or claim 7.

11. A nonlinear optical element for transforming electromagnetic radiation comprising a poled polymer of claim 1.

12. A nonlinear optical device comprising a nonlinear optical element of claim 11 and means to direct at least one incident beam of electromagnetic radiation into said element.

13. A polymer comprising the repeat unit

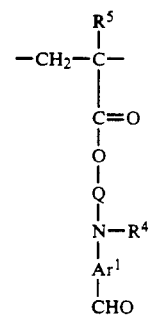

wherein $R^4$ is an alkyl group containing from 1 to about 10 carbon atoms, $R^5$ is selected from the group consisting of hydrogen and methyl, Q is a hydrocarbylene group containing from 1 to about 10 carbon atoms, or $R^4$ and Q taken together form a ring structure containing from 4 to about 10 ring atoms, total, of carbon and nitrogen, or of carbon, nitrogen and oxygen, and $Ar^1$ is an arylene group containing from 6 to about 14 carbon atoms.

14. A polymer in accordance with claim 13 wherein $Ar^1$ is phenylene, Q is 1,2-ethylene, and $R^4$ is methyl or ethyl.

15. A polymer in accordance with claim 1, claim 2, claim 4 or claim 7 wherein each of $B^1$, when present, and $B^3$, when present is

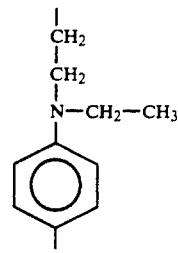

and wherein $B^2$, when present, is selected from the group consisting of aminophenyl, N-alkylaminophenyl, N,N-dialkylaminophenyl, hydroxyphenyl, alkoxyphenyl, alkylthiophenyl, bromophenyl, thiolphenyl, phenyl,

21
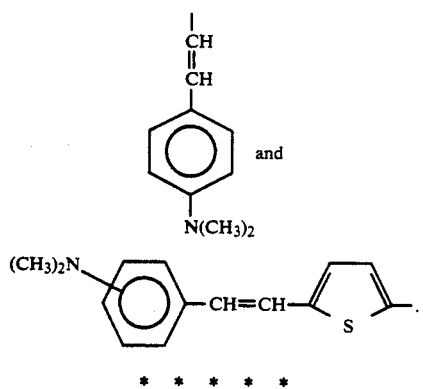
* * * * *
22
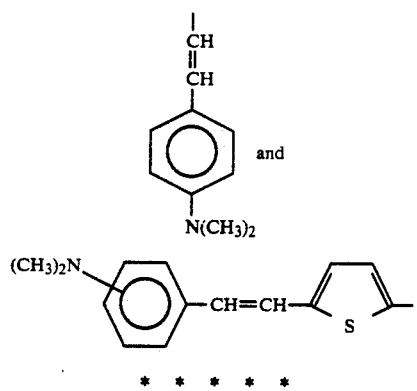
* * * * *